US011803473B2

(12) United States Patent
Kelley et al.

(10) Patent No.: US 11,803,473 B2
(45) Date of Patent: Oct. 31, 2023

(54) COMPUTER PROCESSING DEVICES WITH DYNAMIC SHARED CACHE LINE COPY RETENTION POLICY SELECTION

(71) Applicant: ADVANCED MICRO DEVICES, INC., Santa Clara, CA (US)

(72) Inventors: John Kelley, Ft. Collins, CO (US); Paul Moyer, Ft. Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/521,483

(22) Filed: Nov. 8, 2021

(65) Prior Publication Data

US 2023/0143760 A1    May 11, 2023

(51) Int. Cl.
*G06F 12/08* (2016.01)
*G06F 12/084* (2016.01)
*G06F 12/0811* (2016.01)
*G06F 12/0868* (2016.01)

(52) U.S. Cl.
CPC ........ *G06F 12/084* (2013.01); *G06F 12/0811* (2013.01); *G06F 12/0868* (2013.01)

(58) Field of Classification Search
CPC . G06F 12/084; G06F 12/0811; G06F 12/0868
See application file for complete search history.

(56) References Cited

U.S. PATENT DOCUMENTS

| | | | | |
|---|---|---|---|---|
| 2002/0116576 A1* | 8/2002 | Keshava | ................ | G09G 5/001 711/129 |
| 2004/0230753 A1* | 11/2004 | Amiri | ................... | G06F 9/5016 711/170 |
| 2007/0186054 A1 | 8/2007 | Kruckemyer et al. | | |
| 2010/0180084 A1 | 7/2010 | Cypher | | |
| 2011/0238828 A1* | 9/2011 | Grigsby | .............. | H04L 67/1012 709/227 |
| 2014/0108736 A1 | 4/2014 | Kuskin | | |
| 2021/0165739 A1* | 6/2021 | Srinivasan | .......... | G06F 12/0813 |

OTHER PUBLICATIONS

International Search Report and Written Opinion issued in Application No. PCT/US2022/049096, dated Mar. 28, 2023, 11 pages.
Chaturvedi et al. "Selective Cache Line Replication Scheme in Shared Last Level Cache" Procedia Computer Science, vol. 45, 2015, 13 pages.
Qureshe et al. "Adaptive Insertion Policies for High Performance Caching," Proceedings of the 34th Annual International Symposium on Computer Architecture, 2007, 11 pages, doi:10.1145/1250662.1250709.

* cited by examiner

*Primary Examiner* — Masud K Khan

(57) ABSTRACT

Systems and techniques for dynamic selection of policy that determines whether copies of shared cache lines in a processor core complex are to be stored and maintained in a level 3 (L3) cache of the processor core complex are based on one or more cache line sharing parameters or based on a counter that tracks L3 cache misses and cache-to-cache (C2C) transfers in the processor core complex, according to various embodiments. Shared cache lines are shared between processor cores or between threads. By comparing either the cache line sharing parameters or the counter to corresponding thresholds, a policy is set which defines whether copies of shared cache lines at such indices are to be retained in the L3 cache.

20 Claims, 5 Drawing Sheets

COMPUTER PROCESSING DEVICES WITH DYNAMIC SHARED CACHE LINE COPY RETENTION POLICY SELECTION

BACKGROUND

Computer processing devices, such as central processing units (CPUs) or graphics processing units (GPUs) typically include multiple processor cores, each coupled to a hierarchy of caches for temporary storage of data for potential use by computer applications being executed by such computer processing devices. Data stored in the caches of a given computer processing device is conventionally organized into cache lines, some of which are shared between two or more processing cores or threads of the computer processing device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
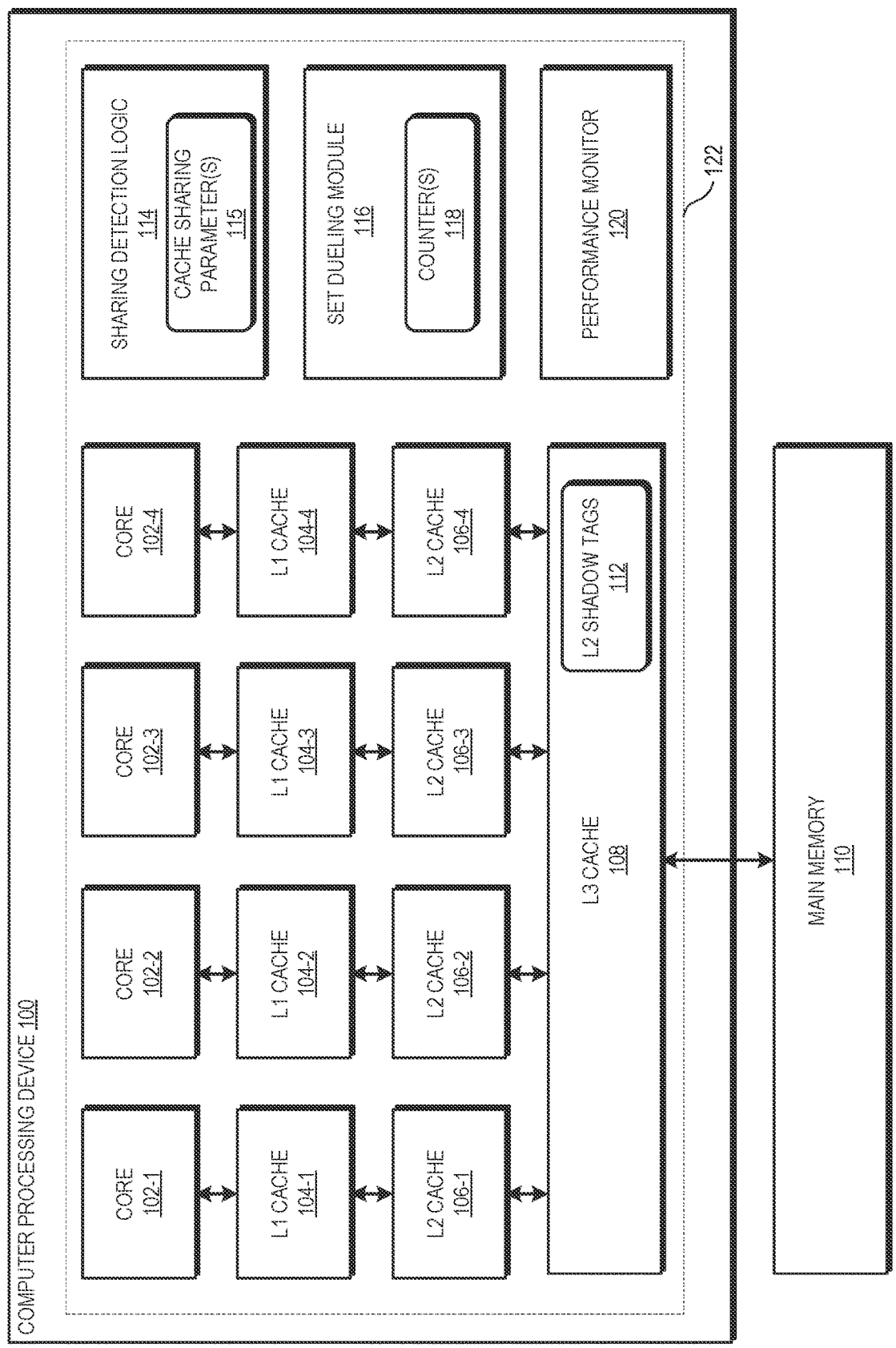
FIG. 1 is a block diagram of a computer processing device configured to selectively enable one or more policies for storing copies of shared cache lines in a level 3 (L3) cache, in accordance with some embodiments.

Computer processing devices, such as central processing units (CPUs) or graphics processing units (GPUs), typically include multiple processing cores (sometimes referred to herein as "cores"), each coupled to a hierarchical cache architecture that includes, for example, level 1 (L1), level 2 (L2), and level 3 (L3) caches. In the cache architecture, at least one L1 cache and an L2 cache are allocated to each core, while an L3 cache is shared between multiple cores. In some cases, data stored in the cache architecture is shared between multiple cores or multiple threads, and each cache line of data shared between two or more cores or cache lines in this way is referred to as a "shared cache line". It is sometimes desirable to keep copies of such shared cache lines in the L3 cache in order to reduce the need for transferring shared cache lines between the L2 caches associated with the cores or threads that share the shared cache lines. For example, a computer processing device's performance can be advantageously improved and, possibly, its power consumption can be advantageously reduced by keeping copies of shared cache lines in the L3 cache, since it takes less time to retrieve a cache line from the L3 cache than to perform a cache-to-cache (C2C) transfer between L2 caches of different cores. However, storing copies of shared cache lines in the L3 cache takes up space that could otherwise be used to increase the unique cache line storage capability of the L3 cache, which impacts the cache hit rate of the L3 cache. Accordingly, systems and techniques described herein relate to dynamic policy selection for whether shared cache line copies are to be retained in the L3 cache.

For example, a first policy causes shared cache line copies to be retained (e.g., stored and maintained) in the L3 cache, a second policy prevents shared cache line copies from being retained in the L3 cache, and either the first policy or the second policy is selected based on one or more cache line sharing parameters or based on counter values in conjunction with a set dueling mechanism, according to various embodiments. In some embodiments, such cache line sharing parameters include a quantity of shared cache lines indicated in L2 shadow tags maintained by the L3 cache (sometimes referred to herein as a "shadow-tag-based cache line sharing parameter") and a quantity of shared cache lines indicated based on memory access requests issued by multiple cores for the same cache line (sometimes referred to herein as a "memory-access-request-based cache line sharing parameter). In some embodiments, the set dueling mechanism causes a first dedicated set of cache line indices of the L2 cache or the L3 cache to be allocated to use the first policy and a second dedicated set of cache lines indices of the L2 cache or the L3 cache to be allocated to use the second policy. A value of a counter is updated based on, for example, observed L3 cache misses and C2C transfers occurring in connection with either the first dedicated set of cache line indices or the second dedicated set of cache line indices. Then, the computer processing device selects either the first policy or the second policy for other sets of cache line indices (sometimes referred to as "follower sets") of the L2 cache or the L3 cache based on the value of the counter relative to a predefined threshold value.

FIG. 1 illustrates a computer processing device 100 for dynamically selecting a policy for retaining shared cache line copies in the L3 cache. The computer processing device 100 is generally configured to execute sets of instructions organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

As shown, the computer processing device 100 includes a core complex 122 having multiple cores 102, L1 caches 104, L2 caches 106, and a shared L3 cache 108. The L1 caches 104, the L2 caches 106, the L3 cache 108, and the main memory 110 are each memory devices generally configured to store data, and can therefore be random access memory (RAM) memory modules, non-volatile memory devices (e.g., flash memory), and the like according to various embodiments. The core complex 122 is coupled to a main memory 110. Each core 102 is associated with an L1 cache 104 and an L2 cache 106. For example, the core 102-1 is coupled to an L1 cache 104-1, to an L2 cache 106-1 via the L1 cache 104-1, and to the L3 cache 108 via the L1 cache 104-1 and the L2 cache 106-1. Continuing the example, the L1 cache 104-1 and the L2 cache 106-1 are configured to temporarily store data for only the core 102-1, whereas the L3 cache 108 is configured to temporarily store data for any of the cores 102.

The cores 102 are configured to generate memory access requests, which represent requests to load or store data that are being used or are known to be needed by a program being executed by one or more of the cores 102. Each of the L1 caches 104, the L2 caches 106, and the L3 cache 108 include respective sets of memory cells (i.e., "cache memory") for storing data and include respective cache controllers configured to perform tasks such as copying data from the main memory 110 or from other caches into the cache memory and attempting to fulfill memory access requests issued by the cores 102 by searching the cache memory for the data requested in such memory access requests.

In some embodiments, the computer processing device 100 includes several core complexes that are structurally similar to the core complex 122, each coupled to the main memory 110, and data can be transferred between different core complexes via a scalable input/output (I/O) fabric, as needed. In some embodiments, each core 102 is capable of implementing multiple (e.g., two, four, eight, etc.) threads concurrently, which is sometimes referred to as "simultaneous multithreading".

In some embodiments, the L3 cache 108 is configured to perform functions of a victim cache that stores cache lines that are evicted from the L2 caches 106. The L3 cache 108 attempts to fulfill a memory access request responsive to a L2 cache miss at any of the L2 caches 106. Generally, the L3 cache attempts to fulfill the memory access request before passing the memory access request to a memory controller of the main memory 110. In some embodiments, the L3 cache 108 maintains a list of L2 shadow tags 112, which duplicate the L2 state and tag entries for all cache line indices in each of the L2 caches 106. In response to an L2 miss or a cache probe from an external core complex, the L3 cache controller checks the L2 shadow tags 112, typically in parallel with checking the cache lines stored in the L3 cache 108 itself, to determine if the data requested in the corresponding memory access request resides in any of the L2 caches 106. By checking the L2 shadow tags 112 with the L3 cache 108, rather than performing the check in each of the L2 caches 106, the burden on L2 cache bandwidth is reduced. For example, if a memory access request from the core 102-1 misses in the L2 cache 106-1 and the L3 cache 108, and the check of the L2 shadow tags 112 indicate a hit in the L2 cache 106-2, a cache controller associated with either or both of the L2 cache 106-2 and the L3 cache 108 will initiate a cache-to-cache (C2C) transfer of the requested cache line from the L2 cache 106-2 to the L2 cache 106-1. Such C2C transfers are typically indicative of the requested cache line being a shared cache line (shared between the core 102-1 and the core 102-2 in the present example). In some embodiments, L2 cache line index state information included in the L2 shadow tags 112 indicates whether a cache line stored at a particular L2 cache line index of one of the L2 caches is in a shared state.

In some embodiments, the core complex 122 includes logic, counters, or both, for use in selecting a policy for storing and maintaining shared cache line copies (sometimes referred to herein as a "shared cache line copy retention policy"), including any of sharing detection logic 114, a set dueling module 116, or a performance monitor 120.

In a first example, the sharing detection logic 114 monitors one or more cache line sharing parameters 115 and sets the shared cache line retention policy based on whether a given cache line sharing parameter 115 exceeds a corresponding threshold. According to various embodiments, the sharing detection logic 114 is implemented in each of the L2 caches 106, in only the L3 cache 108, or in each of the L2 caches 106 and the L3 caches 108. In some embodiments, the cache line sharing parameters 115 include either or both of a shadow-tag-based cache line sharing parameter (i.e., the number of shared cache lines indicated in L2 shadow tags 112 maintained by the L3 cache 108) and a memory-access-request-based cache line sharing parameter (i.e., a number of shared cache lines indicated based on memory access requests issued by multiple cores 102 for the same cache line). In some embodiments, each cache line sharing parameter 115 is calculated for a given time period based on associated data collected during that time period. In some embodiments, the time period is defined by a rolling window, and each cache line sharing parameter is updated continuously or periodically as associated data that falls within the window changes.

For some embodiments in which the cache line sharing parameters 115 include only the shadow-tag-based cache line sharing parameter, the value of this parameter is determined based on the L2 shadow tags 112 over a given time period (e.g., defined by a rolling window) and compared to a predetermined cache line sharing threshold value in order to select the shared cache line copy retention policy. In some embodiments, the sharing detection logic 114 calculates the shadow-tag-based cache line sharing parameter by determining a number of cache lines in each of the L2 caches 106 that are in a shared state based on L2 cache line index state information included in the L2 shadow tags 112 and setting the shadow-tag-based cache line sharing parameter equal to the determined number. In some embodiments, the sharing detection logic 114 calculates the shadow-tag-based cache line sharing parameter by analyzing the L2 shadow tags 112 to determine the number of individual cache lines that are stored in more than one L2 cache 106 (indicating that such a cache line is shared between multiple cores) and setting the shadow-tag-based cache line sharing parameter equal to the determined number. If the shadow-tag-based cache line sharing parameter value exceeds the predetermined cache line sharing threshold value, indicating a relatively high amount of cache line sharing in the core complex 122, the sharing detection logic 114 causes a cache controller associated with either or both of the L2 caches 106 and the L3 cache 108 to set a first shared cache line copy retention policy to cause copies of shared cache lines from the L2 caches 106 to be retained in the L3 cache 108. Otherwise, if the shadow-tag-based cache line sharing parameter value does not exceed the predetermined cache line sharing threshold value, indicating a relatively low amount of cache line sharing in the core complex 122, the sharing detection logic 114 causes the cache controller to set a second shared cache line copy retention policy to prevent shared cache lines copies from being retained the L3 cache 108 (in some instances, this causes such copies that are already stored in the L3 cache 108 to be evicted from the L3 cache 108).

In some embodiments, the first shared cache line copy retention policy causes the L3 cache 108 to be configured to retain copies of shared cache lines when transferring a shared cache line from one L2 cache 106 to another L2 cache 106 (i.e., during a C2C transfer) or when processing a victim cache line that has been evicted from one of the L2 caches 106 and that also has a copy in another of the L2 caches 106. In contrast, the second shared cache line copy retention policy causes the L3 cache 108 to be configured to prevent the retention of copies of shared cache lines in the L3 cache 108 in such scenarios. The first shared cache line copy retention policy typically improves performance of the computer processing device 100 when a copy of a shared cache line that is stored in the L3 cache 108 is requested by another core 102 (i.e., a core 102 not associated with the L2 cache 106 from which the shared cache line was copied) in the core complex 122 or by a core of an external core complex, since the L3 cache 108 is able to satisfy such requests more quickly from the copy of the shared cache line than if the original shared cache line had to be retrieved from its L2 cache 106. The second shared cache line copy retention policy typically improves performance of the computer processing device 100 when cache line sharing between cores is less frequent (when single core workloads or independent workloads that do not require cache line sharing are being processed, for example), since storage capacity in the L3 cache 108 that would otherwise be allocated for storing shared cache line copies is instead made available to store more unique cache lines, generally resulting in a higher cache hit rate across the L2 caches 106 and the L3 cache 108.

For some embodiments in which the cache line sharing parameters 115 include only the memory-access-request-based cache line sharing parameter, the value of this parameter is determined based on memory access requests, cache probes, or both during a given time period (e.g., defined by a rolling window) and is then compared to a predetermined cache line sharing threshold value in order to select the shared cache line copy retention policy. In some embodiments, the sharing detection logic 114 determines the memory-access-request-based cache line sharing parameter value by monitoring the memory access requests issued by the cores 102 and incrementing the memory-access request-based cache line sharing parameter value for each cache line of the L2 caches 106 that is requested by more than one core of the cores 102 (within a given time period, for example). In some embodiments, the sharing detection logic 114 is also configured to increment the memory-access-request-based cache line sharing parameter value in response to determining that a cache probe from an external core complex requests a cache line that is stored in one of the L2 caches 106, as this would effectively make that cache line a shared cache line (shared between cores of different core complexes, in this case). In some embodiments, only cache probes that are non-invalidating and that leave a shared copy of the cache line in the core complex 120 are considered when calculating the memory-access-request-based cache line sharing parameter. If the memory-access-request-based cache line sharing parameter value exceeds the predetermined cache line sharing threshold value, indicating a relatively high amount of cache line sharing in the core complex 122, the sharing detection logic 114 causes the cache controller to set a first shared cache line copy retention policy, as described above. Otherwise, if the memory-access-request-based cache line sharing parameter value does not exceed the predetermined cache line sharing threshold value, indicating a relatively low amount of cache line sharing in the core complex 122, the sharing detection logic 114 causes the cache controller to set the second shared cache line copy retention policy, as described above.

For some embodiments in which the cache line sharing parameter 115 used as the basis for selecting a shared cache line copy retention policy is an aggregate of multiple cache line sharing parameters, the sharing detection logic 114 calculates an average (in some instances, a weighted average) of shadow-tag-based cache line sharing parameter value and the memory-access-request-based cache line sharing parameter value, then compares the average to a predetermined cache line sharing threshold value. If the average exceeds the predetermined cache line sharing threshold value, indicating a relatively high amount of cache line sharing in the core complex 122, the sharing detection logic 114 causes the cache controller to set a first shared cache line copy retention policy described above. Otherwise, if the average does not exceed the predetermined cache line sharing threshold value, indicating a relatively low amount of cache line sharing in the core complex 122, the sharing detection logic 114 causes the cache controller to set the second shared cache line copy retention policy described above.

In some embodiments, rather than determining cache line sharing parameters 115 for the entire core complex 122 and causing the cache controller to set the shared cache line copy retention policy for the L3 cache 108 and all of the L2 caches 106, the sharing detection logic 114 is configured to determine different cache line sharing parameters 115 for each of the cores 102 or for each thread being executed at each of the cores 102 and cause the cache controller to selectively set the shared cache line copy retention policy for retaining shared cache line copies of shared cache lines in a given L2 cache 106 in the L3 cache 108 based on a comparison between a predetermined threshold and the cache line sharing parameters 115 for the corresponding core 102 or the corresponding thread. For example, if a first cache line sharing parameter 115 for the core 102-1 and a second cache line sharing parameter 115 for the core 102-2 each exceed their respective cache line sharing thresholds, and a third cache line sharing parameter 115 for the core 102-3 and a fourth cache line sharing parameter 115 for the core 102-4 each do not exceed their respective cache line sharing thresholds, then the sharing detection logic 114 responsively causes the cache controller to set the L2 caches 106-1 and 106-2 to use the first shared cache line copy retention policy (causing shared cache lines in the L2 caches 106-1 and 106-2 to be retained in the L3 cache 108) and causes the cache controller to set the L2 caches 106-3 and 106-4 to use the second shared cache line copy retention policy (preventing copies of shared cache lines in the L2 caches 106-3 and 106-4 from being retained in the L3 cache 108 and, in some cases, evicting existing copies of such shared cache lines from the L3 cache 108). In some embodiments, the first shared cache line copy retention policy causes all shared cache lines in the L2 caches 106 to be copied (e.g., in bulk) into the L3 cache 108 upon selection and implementation of the policy. In some embodiments, the first shared cache line copy retention policy causes the L3 cache 108 to retain copies of shared cache lines of the L2 caches 106 when such shared cache lines are introduced to the L3 cache 108 as part of another process (e.g., when a shared cache line passes through the L3 cache 108 during a C2C transfer, or when a shared cache line is evicted to the L3 cache 108 from one of the L2 caches 106).

In a second example, the computer processing device implements a set dueling mechanism in conjunction with the set dueling module 116 for dynamic selection of a shared cache line copy retention policy. The set dueling mechanism is implemented by the set dueling module 116 for either the L3 cache 108 or in one or more of the L2 caches 106, according to various embodiments. Herein, "set dueling" refers to a technique by which a cache controller (associated with either or both of the L2 caches 106 and the L3 cache 108, for example) allocates a first set of cache line indices (sometimes referred to as a "first dedicated set") to be used on conjunction with a first policy, allocates a second set of cache line indices (sometimes referred to herein as a "second dedicated set") to be used in conjunction with a second policy, and allocates all other sets of cache line indices (sometimes referred to herein as "follower sets") that are not included in the first and second dedicated sets to be used in conjunction with one of the first policy or the second policy, based on one or more counters (counters 118 in the present example).

In some embodiments, the performance monitor 120 is configured to detect and track respective occurrences of L3 cache misses or C2C transfers for each of the first dedicated set and the second dedicated set, separately. In some embodiments, the set dueling module 116 maintains a single counter 118 that is incremented each time a L3 cache miss or a C2C transfer is detected by the performance monitor 120 for any cache line index in the first dedicated set and is decremented each time a L3 cache miss or a C2C transfer is detected by the performance monitor 120 for any cache line index in the in the second dedicated set. Herein, an "L3 cache miss" refers to an instance where a cache controller attempting to fulfill a memory access request is unable to find the requested data (e.g., in a corresponding cache line) in the L3 cache. According to various embodiments, the amount by which the counter is incremented or decremented differs for L3 cache misses compared to the amount for C2C transfers, effectively weighting L3 cache misses and C2C transfers differently. The set dueling module 116 then compares the value of the counter 118 to a counter threshold. Responsive to determining that the value of the counter 118 exceeds the counter threshold, the set dueling module 116 configures the cache controller to cause the L3 cache 108 to use the first policy in conjunction with the follower sets. Responsive to determining that the value of the counter 118 does not exceed the counter threshold, the set dueling module 116 configures the cache controller to cause the L3 cache 108 to use the second policy in conjunction with the follower sets. In some embodiments, the first policy is the first shared cache line copy retention policy described above and the second policy is the second shared cache line copy retention policy described above.

For embodiments in which the set dueling mechanism is implemented in the L2 caches 106, one or more cache controllers allocate a first dedicated set of L2 cache lines of the L2 caches 106 for use in conjunction with the first shared cache line copy retention policy that causes shared cache line copies (corresponding to shared cache lines of the L2 cache 106 using the policy) to be retained in the L3 cache 108 and allocate a second dedicated set of L2 cache line indices of the L2 caches 106 for use in conjunction with the second shared cache line copy retention policy that prevents retention of shared cache line copies (corresponding to shared cache lines of the L2 cache 106 using the policy) in the L3 cache 108. In some embodiments, respectively separate set dueling mechanisms are implemented in each of the L2 caches 106, while in other embodiments a single set dueling mechanism is implemented to allocate the first and second dedicated sets and the follower sets across several or all of the L2 caches 106.

The counter 118 is incremented or decremented by the set dueling module 116 based on L3 cache misses and C2C transfers detected by the performance monitor 120 that result from memory access requests for shared cache lines of the first dedicated set or from memory access requests for shared cache lines of the second dedicated set, respectively. The set dueling module 116 periodically compares the value of the counter 118 to a counter threshold. Responsive to determining that the value of the counter 118 exceeds the counter threshold, the set dueling module 116 configures one or more cache controllers to cause the L3 cache 108 to use the first shared cache line copy retention policy for follower sets of the L2 caches 106. Responsive to determining that the value of the counter 118 does not exceed the counter threshold, the set dueling module 116 configures one or more cache controllers to cause the L3 cache 108 to use the second shared cache line copy retention policy for follower sets of the L2 caches 106.

For embodiments in which the set dueling mechanism is implemented in the L3 cache 108, one or more cache controllers allocate a first dedicated set of L3 cache line indices of the L3 cache 108 for use in conjunction with the first shared cache line copy retention policy that causes shared cache line copies to be retained in the L3 cache 108 and allocate a second dedicated set of L3 cache line indices of the L3 cache 108 for use in conjunction with the second shared cache line copy retention policy that prevents retention of shared cache line copies in the L3 cache 108. For example, the first shared cache line copy retention policy causes the first dedicated set of L3 cache line indices to retain copies of shared cache lines that are stored in the L2 caches 106 or the L1 caches 104, and the second shared cache line copy retention policy prevents the second dedicated set of L3 cache line indices from retaining copies of shared cache lines that are stored in the L2 caches 106 or the L1 caches 104.

The counter 118 is incremented or decremented based on L3 cache misses and C2C transfers detected by the set dueling module 116 for the first dedicated set or the second dedicated set, respectively. The set dueling module 116 periodically compares the value of the counter 118 to a counter threshold. Responsive to determining that the value of the counter 118 exceeds the counter threshold, the set dueling module 116 configures one or more cache controllers to cause the L3 cache 108 to use the first shared cache line copy retention policy for follower sets of the L3 cache 108. Responsive to determining that the value of the counter 118 does not exceed the counter threshold, the set dueling module 116 configures one or more cache controllers to cause the L3 cache 108 to use the second shared cache line copy retention policy for follower sets of the L3 cache 108.

Figure 2:
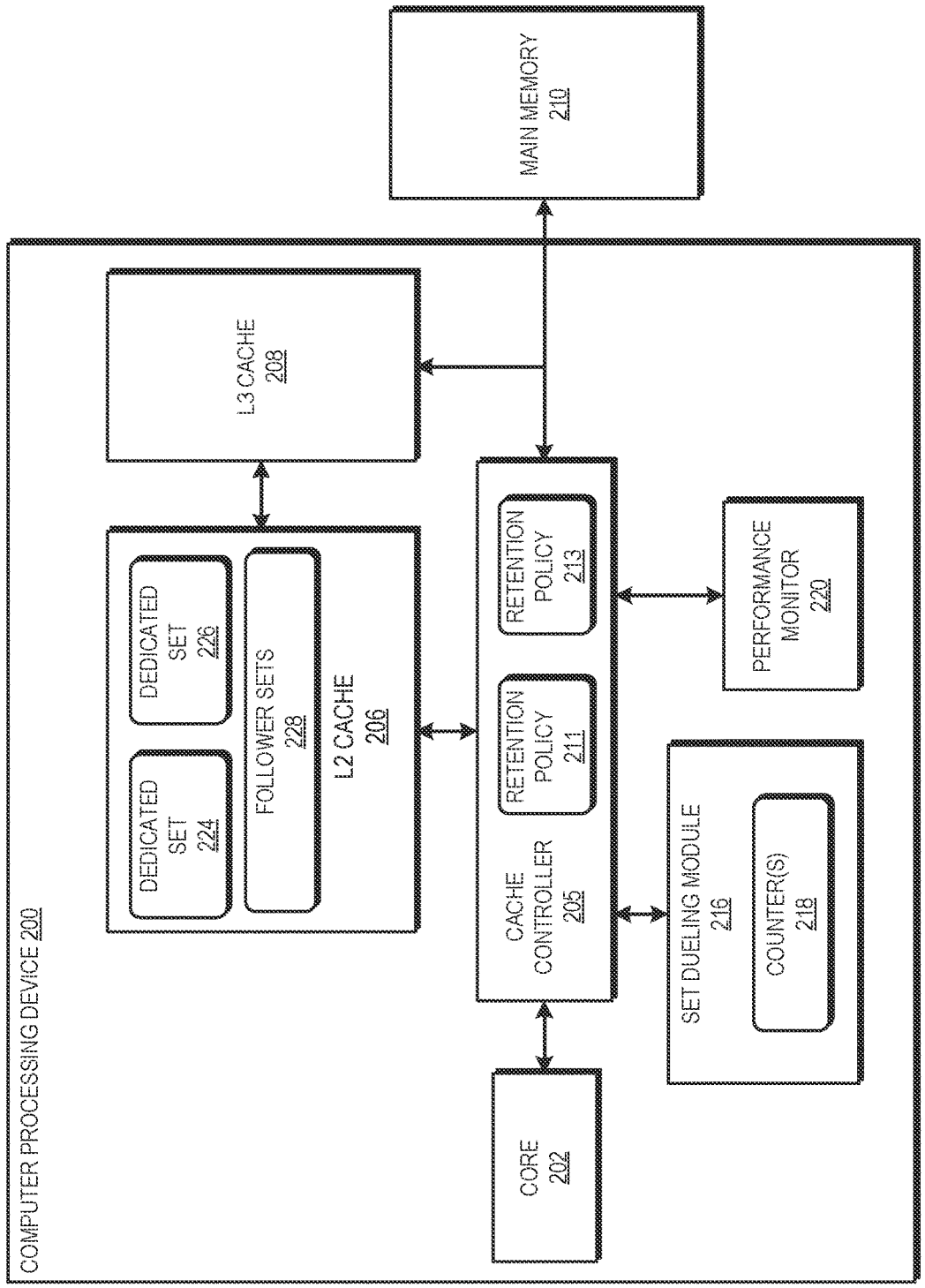
FIG. 2 is a block diagram of a computer processing device configured to implement a set dueling mechanism to selectively enable one or more policies for storing copies of shared cache lines in a L3 cache, in accordance with some embodiments.

FIG. 2 illustrates a computer processing device 200 (an embodiment of the computer processing device 100 of FIG. 1, for example) dynamically selects a shared cache line copy policy for an L3 cache using a set dueling mechanism, in accordance with some embodiments. The computer processing device 200 is generally configured to execute sets of instructions organized in the form of computer programs in order to carry out tasks on behalf of an electronic device. Accordingly, the computer processing device 200 is usable in any of a variety of electronic devices, such as a desktop or laptop computer, server, smartphone, tablet, game console, and the like.

The computer processing device 200 includes a core 202 (i.e., a processor core), a cache controller 205, a L2 cache 206, and a L3 cache 208. It should be understood that the computer processing device 200 includes multiple cores 202, cache controllers 205, and L2 caches 206 in some embodiments, though only one of each of these components is depicted in the present example. In some embodiments, each of the modules of the computer processing device 200 are formed on the same semiconductor die, and the main memory 210 is formed on a different semiconductor die and connected to the computer processing device 200 via one or more busses or signal lines. In some embodiments, at least a portion of the main memory 210 is formed on the same semiconductor die as modules of the computer processing device 200.

The cache controller 205 is a module generally configured to manage the memory hierarchy of the computer processing device 200 by moving data between the L2 cache 206, the L3 cache 208, and the main memory 210. In particular, the L2 cache 206 and L3 cache 208 are memory devices, each of which includes a plurality of entries, whereby each entry is associated with one or more addresses of the main memory 210. In response to a memory access request, the cache controller 205 reviews the data stored at one or more entries of the L2 cache 206 to determine if any of the entries stores data associated with the memory address targeted by the memory access request. If so, the cache controller 105 indicates a cache hit and satisfies the memory access request at the identified entry, either by storing data at the entry (in the case of a store operation) or by providing the data at the identified entry to the processor core 202 (in the case of a load operation).

If data associated with the memory address is not stored at an entry of the L2 cache 206, the cache controller 205 indicates a cache miss and issues a request to the L3 cache 208. In response to the memory access request, the cache controller 205 (or, in some embodiments, a separate cache controller associated with the L3 cache 208) reviews the data stored at one or more entries of the L3 cache 208 to determine if any of the entries stores data associated with the memory address targeted by the memory access request. If so, the cache controller 205 indicates a cache hit and satisfies the memory access request at the identified entry, either by storing data at the entry (in the case of a store operation) or by providing the data at the identified entry to the L2 cache 206, from which it is subsequently provided to the processor core 202 (in the case of a load operation). If data associated with the memory address is not stored in an entry of the L3 cache 208, the cache controller 205 indicates a cache miss and issues a request to the main memory 210 for the data at the memory address. Upon receipt of the data from the main memory 210, the cache controller 205 stores the data at an entry of the L3 cache 208, from which it is subsequently transferred to the L2 cache 206, which in turn provides the data to the processor core 202, thus satisfying the memory access request.

In the depicted example of FIG. 2, the L2 cache 206 includes three regions: dedicated sets 224 and 226 (corresponding to respective test regions), and follower sets 228 (corresponding to a non-test region). In addition, the cache controller 205 stores first and second shared cache line copy retention policies 211 and 213 that differ in at least one aspect, such as whether copies of shared cache lines in the L2 cache 206 are to be retained in the L3 cache 208. Thus, in the example of FIG. 2, the first shared cache line copy retention policy 211 mandates that shared cache line copies from the L2 cache 206 are to be retained in the L3 cache 208. In contrast, second shared cache line copy retention policy 213 mandates that shared cache line copies from the L2 cache 206 are not to be retained in the L3 cache 208. The first shared cache line copy retention policy 211 generally improves the performance of the computer processing device 200 for instances in which shared cache lines of the L2 cache 206 are more frequently requested by cores associated with other L2 caches or cores in external core complexes, since the L3 cache 208 is able to service such requests more quickly if copies of the requested cache lines are stored therein. The second shared cache line copy retention policy 212 provides more space in the L3 cache 208 for storing unique cache lines, which typically improves the cache hit rate for the cache hierarchy that includes the L3 cache 208. The rate at which shared cache lines of the L2 cache 206 are requested by other cores typically varies over time, such that the cache 110 operates more efficiently under different transfer policies at different times. The first dedicated set 224 is allocated for use in conjunction with the first shared cache line copy retention policy 211 and the second dedicated set 226 is allocated for use in conjunction with the second shared cache line copy retention policy 213. For the follower sets 228, the cache controller 205 selects between the shared cache line copy retention policies 211 and 213 depending on performance characteristics (e.g., L3 cache miss rate and number of C2C transfers corresponding to memory access requests associated with each set) of the first dedicated set 224 and the second dedicated set 226.

To illustrate, the computer processing device 200 includes a performance monitor 220 (e.g., an embodiment of the set dueling module 120 of FIG. 1) that monitors and records performance characteristics, such as L3 cache miss rate and number of C2C transfers, for each of the first dedicated set 224 and the second dedicated set 226. Based on one or more of the performance characteristics, or a combination thereof, of the first dedicated set 224 and the second dedicated set 226, the cache controller 205 selects one of the shared cache line copy retention policies 211 and 213 and applies it to the follower sets 228. For example, each time a L3 cache miss is detected by the performance monitor 220 for the first dedicated set 224, the set dueling module 216 increases the value of a counter 218 by a first amount, each time a L3 cache miss is detected by the performance monitor 220 for the second dedicated set 226, the set dueling module 216 decreases the value of the counter 218 by the first amount, each time a C2C transfer is detected by the performance monitor 220 for the first dedicated set 224, the set dueling module 216 increases the value of the counter 218 by a second amount, and each time a C2C transfer is detected by the performance monitor 220 for the second dedicated set 226, the set dueling module 216 decreases the value of the counter 218 by the second amount. In some embodiments, the follower sets 228 include the majority of the entries of the L2 cache 206. Thus, by selecting the shared cache line copy retention policy for the L2 cache 206 and the L3 cache 208 as the policy indicated to be most efficient based on the performance characteristics detected by the performance monitor 220, the cache controller 205 enhances the overall efficiency of the L2 cache 206 and the L3 cache 208. Further, as the performance characteristics of the first and second dedicated sets 224 and 226 change over time, the cache controller changes the shared cache line copy policy to the policy (of the first and second shared cache line copy retention policies 211 and 213, for example) that is more efficient for a given set of performance characteristics.

While in the example of FIG. 2, the implemented set dueling mechanism allocates first and second dedicated sets 224 and 226 and the follower sets 228 in the L2 cache 206, it should be understood that the set dueling mechanism can instead be implemented in the L3 cache 208 or across multiple L2 caches (e.g., embodiments of the L2 caches 106 of FIG. 1), according to various other embodiments.

Figure 3:
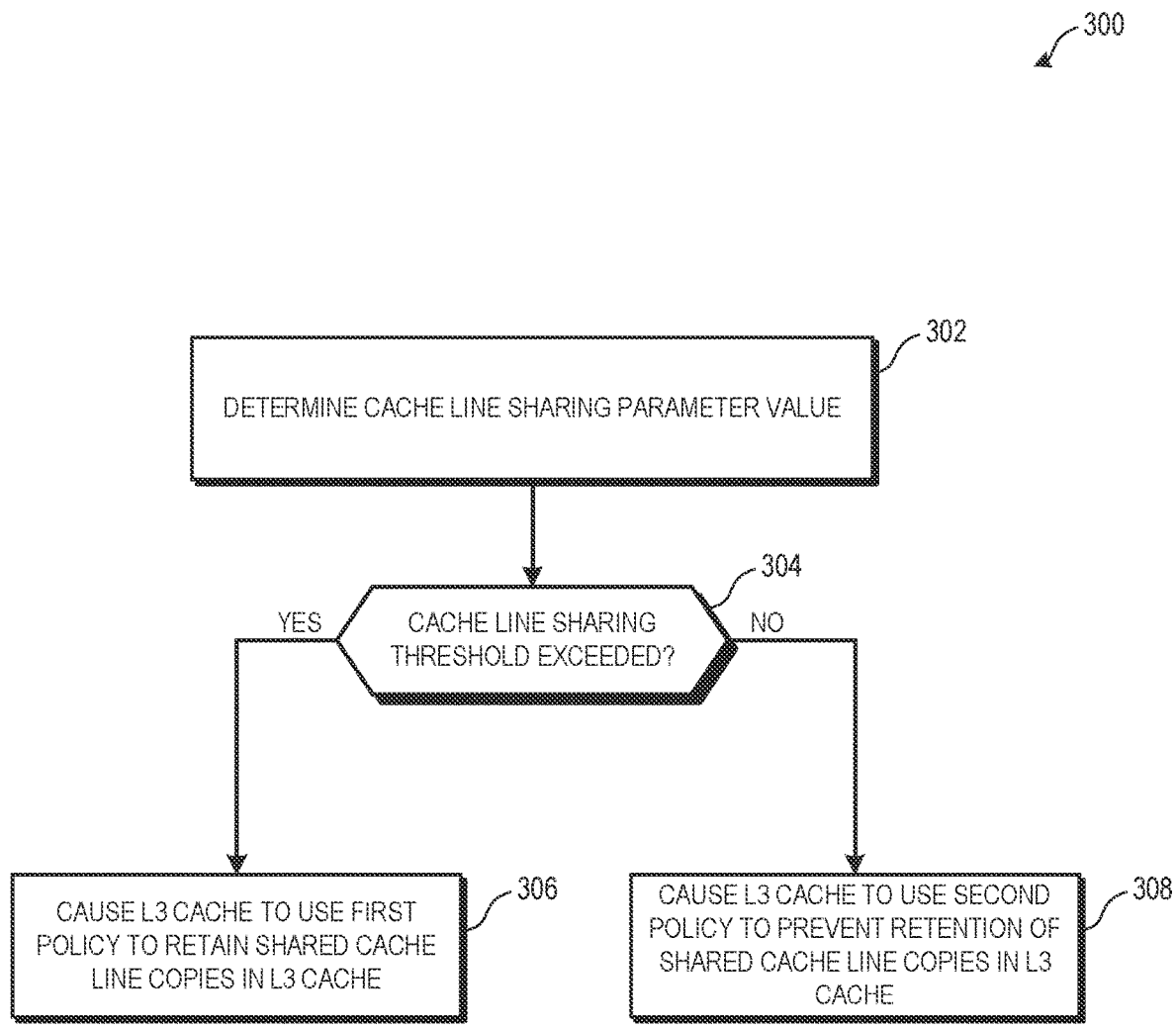
FIG. 3 is a flow diagram illustrating a method for selecting a shared cache line copy retention policy based on one or more cache line sharing parameters for a given core complex of a computer processing device, accordance with some embodiments.

FIG. 3 illustrates a method 300 of dynamically selecting a shared cache line copy retention policy based on one or more cache line sharing parameters for a given core complex of a computer processing device. For ease of illustration, the method 300 is described with respect to an example implementation of the computer processing device 100 of FIG. 1 and its constituent components. In some embodiments, an embodiment of the computer processing device 100 performs the method 300, at least in part, via execution of computer-readable instructions at one or more of the cores 102 and cache controllers of the L2 caches 106, and the L3 cache 108.

At block 302, the sharing detection logic 114 determines one or more cache line sharing parameters values (values corresponding to some embodiments of the cache line sharing parameters 115, for example) during operation of the computer processing device 100. In some embodiments, the sharing detection logic 114 monitors memory access requests issued by the cores 102 to determine a memory-access-request-based cache line sharing parameter value. For example, if the sharing detection logic 114 determines that a given cache line is requested in memory access requests issued by two or more of the cores 102 during a given time period, the given cache line is identified as a shared cache line and the sharing detection logic 114 increments the memory-access-request-based cache line sharing parameter value accordingly. In some embodiments, the sharing detection logic 114 also increments the memory-access-request-based cache line sharing parameter value in response to determining that a cache probe originating in another core complex requests a cache line stored in one of the L2 caches 106, since this indicates that the requested cache line is a shared cache line and such requests could be fulfilled more quickly if a copy of the shared cache line were stored in the L3 cache 108. In some embodiments, the sharing detection logic 114 checks the L2 shadow tags 112 to determine a shadow-tag-based cache line sharing parameter value. For example, the sharing detection logic 114 sets the shadow-tag-based cache line sharing parameter value equal to the number of L2 cache lines that are indicated to be shared by multiple cores 102 based on state or tag information included in the L2 shadow tags 112. According to various embodiments, the determined cache line sharing parameter value is any of the shadow-tag-based cache line sharing parameter, the memory-access-request-based cache line sharing parameter, or an aggregate cache line sharing parameter (e.g., an average of the shadow-tag-based cache line sharing parameter value and the memory-access-request-based cache line sharing parameter value).

At block 304, the sharing detection logic 114 compares the determined cache line sharing parameter value to a cache line sharing threshold value. In some embodiments, the cache line sharing parameter value corresponds to a memory-access-request-based cache line sharing parameter value representing a number of shared cache lines determined based on a quantity of memory access requests, cache probes, or both targeting shared cache lines in the core complex 120, and the cache line sharing threshold value corresponds to a threshold number of such memory access requests, cache probes, or both. In some embodiments, the cache line sharing parameter value corresponds to a shadow-tag-based cache line sharing parameter value that is indicative of a quantity of shared cache lines indicated in the L2 shadow tags 112 of the L3 cache 108, and the cache line sharing threshold value corresponds to a threshold number of such shared cache lines. A determination that the cache line sharing threshold value exceeds the cache line sharing parameter value indicates a high incidence of cache line sharing between multiple cores 102 of the core complex 120 (or, in some instances, cores outside of the core complex 120), such that implementation of a policy (e.g., the first shared cache line copy retention policy) to retain shared cache line copies in the L3 cache 108 would improve performance of the computer processing device 100. If the sharing detection logic 114 determines that the cache line sharing parameter value exceeds the cache line sharing threshold, then the method 300 proceeds to block 306. If the sharing detection logic 114 determines that the cache line sharing parameter value does not exceed the cache line sharing threshold, then the method 300 proceeds to block 308.

At block 306, responsive to the determination that the cache line sharing threshold is exceeded by the cache line sharing parameter value, the sharing detection logic 114 causes the L3 cache 108 to follow a first policy (e.g., a first shared cache line retention policy) according to which the L3 cache 108 retains shared cache lines copies (corresponding to shared cache lines of the L2 caches 106) in the L3 cache 108. In some embodiments, a cache controller associated with the L3 cache 108 sets the first policy in response to receiving an indication from the sharing detection logic 114 that the cache sharing threshold is exceeded by the cache line sharing parameter value.

At block 308, responsive to the determination that the cache line sharing threshold is not exceeded by the cache line sharing parameter value, the sharing detection logic 114 causes the L3 cache 108 to follow a second policy (e.g., a second shared cache line retention policy) according to which the L3 cache 108 prevents retention of shared cache lines copies (corresponding to shared cache lines of the L2 caches 106) in the L3 cache 108. In some embodiments, a cache controller associated with the L3 cache 108 sets the second policy in response to receiving an indication from the sharing detection logic 114 that the cache sharing threshold is not exceeded by the cache line sharing parameter value. It should be noted that the second policy does not prevent the L3 cache 108 from temporarily storing a copy of a shared cache line when servicing, for example, a C2C transfer, and instead prevents the L3 cache 108 from storing copies of shared cache lines that are already stored in one or more of the L2 caches 106 or the L1 caches 104.

Figure 4:
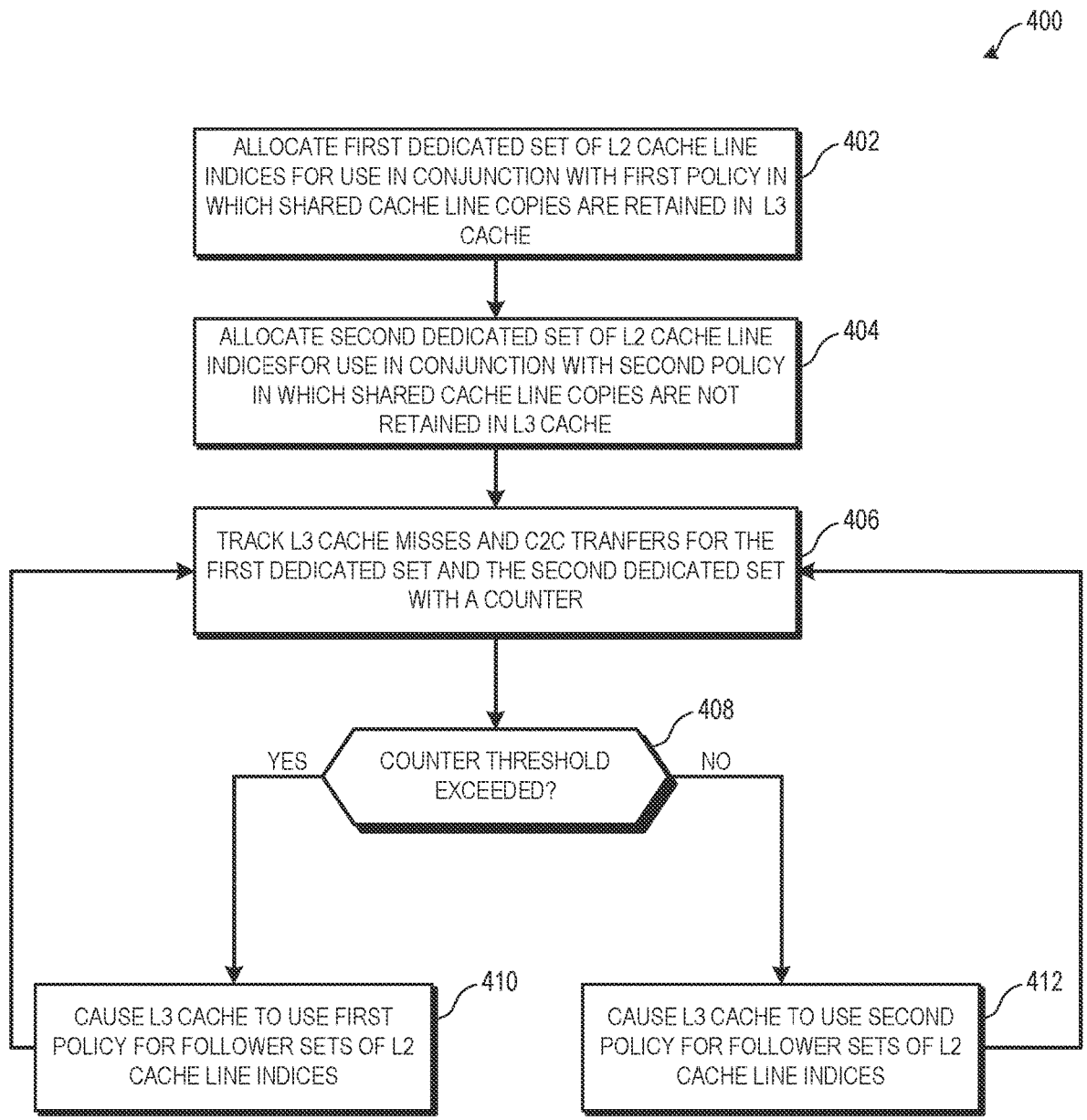
FIG. 4 is a flow diagram illustrating a method for selecting a shared cache line copy retention policy in accordance with a set dueling mechanism implemented in level 2 (L2) caches of a core complex of a computer processing device, accordance with some embodiments.

FIG. 4 illustrates a method 400 of dynamically selecting a shared cache line copy retention policy in accordance with a set dueling mechanism implemented in one or more L2 caches of a core complex of a computer processing device. For ease of illustration, the method 400 is described with respect to an example implementation of the computer processing device 100 of FIG. 1 and its constituent components. However, it should be understood that the method 400 is performed using one or more embodiments of the computer processing device 200 of FIG. 2 in some embodiments. In some embodiments, an embodiment of the computer processing device 100 performs the method 400, at least in part, via execution of computer-readable instructions at one or more of the cores 102 and cache controllers of the L2 caches 106, and the L3 cache 108.

At block 402, the set dueling module 116 causes one or more cache controller associated with the L2 caches 106 to allocate a first dedicated set of L2 cache line indices for use in conjunction with a first policy (e.g., a first shared cache line retention policy) in accordance with which shared cache line copies originating from the first dedicated set are retained in the L3 cache 108.

At block 404, the set dueling module 116 causes the one or more cache controllers to allocate a second dedicated set of L2 cache line indices for use in conjunction with a second policy (e.g., a second shared cache line retention policy) in accordance with which shared cache line copies originating from the second dedicated set are not retained in the L3 cache 108.

At block 406, the performance monitor 120 detects L3 cache misses and C2C transfers associated with the first dedicated set of L2 cache line indices and separately detects L3 cache misses and C2C transfers associated with the first dedicated set of L2 cache line indices, and the set dueling module 116 tracks these events using a counter 118. For example, the set dueling module 116 increments the counter by a first amount for each detected L3 cache miss associated with a memory access request for a cache line of the first dedicated set, increments the counter by a second amount for each detected C2C transfer associated with a memory access request for a cache line of the first dedicated set, decrements the counter by the first amount for each detected L3 cache miss associated with a memory access request for a cache line of the second dedicated set, and decrements the counter by the second amount for each detected C2C transfer associated with a memory access request for a cache line of the second dedicated set. In some embodiments, the first amount and the second amount are the same. In some embodiments, the second amount is greater than the first amount, which effectively weights C2C transfers higher than L3 cache misses in terms of their respective effects on the value of the counter. In some alternate embodiments, the set dueling logic uses a first counter of the counters 118 to track L3 cache misses and C2C transfers associated with the first dedicated set and uses a second counter of the counters 118 to track L3 cache misses and C2C transfers associated with the second dedicated set.

At block 408, the set dueling module 116 compares the counter value to a counter threshold value. If the counter threshold value is exceeded by the counter value, the method 400 proceeds to block 410. If the counter threshold value is not exceeded by the counter value, the method 400 proceeds to block 412.

At block 410, the set dueling module 116 causes the L3 cache 108 to use the first policy for follower sets of the L2 cache line indices, where the first policy causes shared cache line copies originating from the follower sets to be retained in the L3 cache 108. In some embodiments, a cache controller associated with the L3 cache 108 sets the first policy for the follower sets in response to receiving an indication from the set dueling module 116 that the counter threshold value is exceeded by the counter value.

At block 412, the set dueling module 116 causes the L3 cache 108 to use the second policy for follower sets of the L2 cache line indices, where the second policy prevents shared cache line copies originating from the follower sets from being retained in the L3 cache 108. In some embodiments, a cache controller associated with the L3 cache 108 sets the second policy for the follower sets in response to receiving an indication from the set dueling module 116 that the counter threshold value is not exceeded by the counter value.

Figure 5:
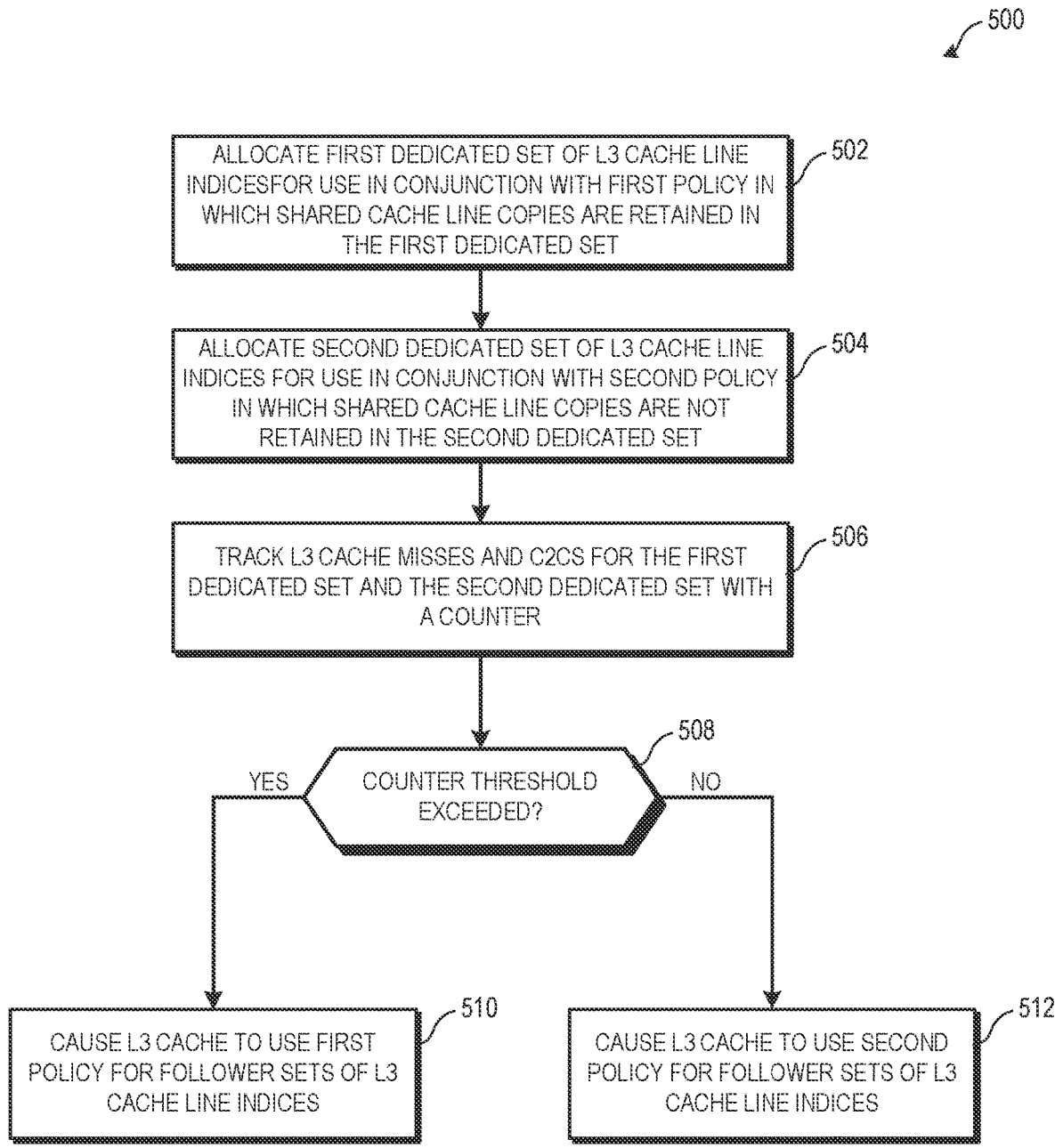
FIG. 5 is a flow diagram illustrating a method for selecting a shared cache line copy retention policy in accordance with a set dueling mechanism implemented in an L3 cache of a core complex of a computer processing device, accordance with some embodiments.

FIG. 5 illustrates a method 500 of dynamically selecting a shared cache line copy retention policy in accordance with a set dueling mechanism implemented in one or more L2 caches of a core complex of a computer processing device. For ease of illustration, the method 500 is described with respect to an example implementation of the computer processing device 100 of FIG. 1 and its constituent components. However, it should be understood that the method 500 is performed using one or more embodiments of the computer processing device 200 of FIG. 2 in some embodiments. In some embodiments, an embodiment of the computer processing device 100 performs the method 500, at least in part, via execution of computer-readable instructions at one or more of the cores 102 and cache controllers of the L2 caches 106, and the L3 cache 108.

At block 502, the set dueling module 116 causes a cache controller associated with the L3 cache 108 to allocate a first dedicated set of L3 cache line indices for use in conjunction with a first policy (e.g., a first shared cache line retention policy) in accordance with which shared cache line copies originating from the L2 caches 106 are retained in the first dedicated set of L3 cache line indices of the L3 cache 108.

At block 504, the set dueling module 116 causes the cache controller to allocate a second dedicated set of L3 cache line indices for use in conjunction with a second policy (e.g., a second shared cache line retention policy) in accordance with which shared cache line copies originating from the L2 caches 106 are not retained in the second dedicated set of L3 cache line indices of the L3 cache 108.

At block 506, the performance monitor 120 detects L3 cache misses and C2C transfers associated with the first dedicated set of L3 cache line indices and separately detects L3 cache misses and C2C transfers associated with the first dedicated set of L3 cache line indices, and the set dueling module tracks these events using a counter 118. For example, the set dueling module 116 increments the counter by a first amount for each detected L3 cache miss associated with a memory access request for a cache line of the first dedicated set, increments the counter by a second amount for each detected C2C transfer associated with a memory access request for a cache line of the first dedicated set, decrements the counter by the first amount for each detected L3 cache miss associated with a memory access request for a cache line of the second dedicated set, and decrements the counter by the second amount for each detected C2C transfer associated with a memory access request for a cache line of the second dedicated set. In some embodiments, the first amount and the second amount are the same. In some embodiments, the second amount is greater than the first amount, which effectively weights C2C transfers higher than L3 cache misses in terms of their respective effects on the value of the counter. In some alternate embodiments, the set dueling logic uses a first counter of the counters 118 to track L3 cache misses and C2C transfers associated with the first dedicated set and uses a second counter of the counters 118 to track L3 cache misses and C2C transfers associated with the second dedicated set.

At block 508, the set dueling module 116 compares the counter value to a counter threshold value. If the counter threshold value is exceeded by the counter value, the method 500 proceeds to block 510. If the counter threshold value is not exceeded by the counter value, the method 500 proceeds to block 512.

At block 510, the set dueling module 116 causes the L3 cache 108 to use the first policy for follower sets of the L3 cache line indices, where the first policy causes shared cache line copies originating from the L2 caches 106 to be retained in follower sets of the L3 cache line indices of the L3 cache 108. In some embodiments, the cache controller associated with the L3 cache 108 sets the first policy for the follower sets in response to receiving an indication from the set dueling module 116 that the counter threshold value is exceeded by the counter value.

At block 512, the set dueling module 116 causes the L3 cache 108 to use the second policy for follower sets of the L3 cache line indices, where the second policy prevents shared cache line copies originating from the L2 caches 106 from being retained in follower sets of the L3 cache line indices of the L3 cache 108. In some embodiments, the cache controller associated with the L3 cache 108 sets the second policy for the follower sets in response to receiving an indication from the set dueling module 116 that the counter threshold value is not exceeded by the counter value.

In some embodiments, the apparatus and techniques described above are implemented in a system including one or more integrated circuit (IC) devices (also referred to as integrated circuit packages or microchips), such as the computer processing device 100 described above with reference to FIG. 1. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining a cache line sharing parameter indicative of a quantity of shared cache lines in a plurality of caches of a first level of a computer processing device; and
   setting a shared cache line copy retention policy for a cache of a second level that is coupled to the plurality of caches based on the cache line sharing parameter.

2. The method of claim 1, wherein determining the cache line sharing parameter comprises:
   identifying, based on memory access requests issued by cores of the computer processing device, cache lines requested by more than one of the cores as being first shared cache lines; and
   determining the cache line sharing parameter based, at least in part, on the first shared cache lines.

3. The method of claim 2, wherein determining the cache line sharing parameter further comprises:
   identifying, based on cache probes issued by cores of external core complexes, cache lines of the plurality of caches that are requested in the cache probes as being second shared cache lines, wherein the cache line sharing parameter is determined further based on the second shared cache lines.

4. The method of claim 1, wherein determining the cache line sharing parameter comprises:
   determining the cache line sharing parameter based on a number of shared cache lines indicated in shadow tags stored in the cache of the second level, wherein the shadow tags provide a listing of all cache lines in the plurality of caches.

5. The method of claim 1, wherein determining the cache line sharing parameter comprises:
   identifying, based on memory access requests issued by cores of the computer processing device, cache lines requested by more than one of the cores as being first shared cache lines;

determining a first cache line sharing parameter based, at least in part, on the first shared cache lines;

determining a second cache line sharing parameter based on a number of shared cache lines indicated in shadow tags stored in the cache of the second level, wherein the shadow tags provide a listing of all cache lines in the plurality of caches; and determining the cache line sharing parameter as an average of the first cache line sharing parameter and the second cache line sharing parameter.

6. The method of claim 1, wherein the shared cache line copy retention policy for the cache of the second level determines whether copies of shared cache lines of the plurality of caches are retained in the cache of the second level.

7. A method comprising:

implementing set dueling in a core complex of a computer processing device to select a shared cache line copy retention policy for a set of caches of a first level and a cache of a second level.

8. The method of claim 7, wherein implementing the set dueling comprises:

allocating a first dedicated set of cache line indices for use in conjunction with a first shared cache line copy retention policy;

allocating a second dedicated set of cache line indices for use in conjunction with a second shared cache line copy retention policy; and tracking cache misses associated with the cache of the second level and cache-to-cache (C2C) transfers associated with each of the first dedicated set and the second dedicated set, separately, using a counter; and configuring, based on the counter, the cache of the second level to use one of the first shared cache line copy retention policy and second first shared cache line copy retention policy for one or more follower sets of cache line indices.

9. The method of claim 8, wherein the first dedicated set of cache line indices, the second dedicated set of cache line indices, and the one or more follower sets of cache line indices are cache line indices of the set of caches of a first level of the core complex.

10. The method of claim 8, wherein the first dedicated set of cache line indices, the second dedicated set of cache line indices, and the one or more follower sets of cache line indices are cache line indices of the cache of the second level.

11. The method of claim 8, wherein the first shared cache line copy retention policy causes the cache of the second level to retain copies of shared cache lines of the set of caches of a first level of the core complex, and the second shared cache line copy retention policy causes the cache of the second level to not retain copies of shared cache lines of the set of caches of the first level.

12. A computer processing device comprising:

a set of caches of a first level; and a cache of a second level coupled to the set of caches of the first level, the computer processing device being configured to dynamically select a shared cache line copy retention policy that determines whether shared cache lines of at least one cache of the set of caches of the first level are retained in the cache of the second level.

13. The computer processing device of claim 12, further comprising:

sharing detection logic configured to determine a cache line sharing parameter indicative of a quantity of shared cache lines in the at least one cache of the set of caches of the first level, wherein the cache of the second level is configured to dynamically select the shared cache line copy retention policy based on the cache line sharing parameter.

14. The computer processing device of claim 13, further comprising:

a plurality of processor cores coupled to the set of caches of the first level, wherein the sharing detection logic is configured to:

identify, based on memory access requests issued by any of the plurality of processor cores, cache lines of the at least one cache of the set of caches of the first level that are requested by more than one of the plurality of processor cores as being first shared cache lines; and determine the cache line sharing parameter based, at least in part, on a quantity of the first shared cache lines.

15. The computer processing device of claim 13, wherein the sharing detection logic is configured to determine the cache line sharing parameter based on a number of shared cache lines indicated in shadow tags stored in the cache of the second level, wherein the shadow tags provide a listing of all cache lines in the set of caches of the first level.

16. The computer processing device of claim 12, further comprising:

a set dueling module configured to implement a set dueling mechanism in the computer processing device, wherein the cache of the second level is configured to dynamically select the shared cache line copy retention policy based on a counter associated with the set dueling mechanism.

17. The computer processing device of claim 16, wherein the set dueling module is configured to:

allocate a first dedicated set of cache line indices for use in conjunction with a first shared cache line copy retention policy;

allocate a second dedicated set of cache line indices for use in conjunction with a second shared cache line copy retention policy; and track cache misses associated with the cache of the second level and cache-to-cache (C2C) transfers associated with each of the first dedicated set and the second dedicated set, separately, using the counter, wherein the cache of the second level is configured to select, based on the counter, one of the first shared cache line copy retention policy and second first shared cache line copy retention policy to be used for one or more follower sets of cache line indices.

18. The computer processing device of claim 17, wherein the first dedicated set of cache line indices, the second dedicated set of cache line indices, and the one or more follower sets of cache line indices are cache line indices of the at least one cache of the set of caches of the first level.

19. The computer processing device of claim 17, wherein the first dedicated set of cache line indices, the second dedicated set of cache line indices, and the one or more follower sets of cache line indices are cache line indices of the cache of the second level.

20. The computer processing device of claim 17, wherein the first shared cache line copy retention policy causes the cache of the second level to retain copies of shared cache lines of the at least one cache of the set of caches of the first level, and the second shared cache line copy retention policy causes the cache of the second level to not retain copies of shared cache lines of the at least one cache of the set of caches of the first level.

\* \* \* \* \*